(12) United States Patent
Huang et al.

(10) Patent No.: US 8,594,961 B2
(45) Date of Patent: Nov. 26, 2013

(54) REMOTE INTERROGATION OF A PASSIVE WIRELESS ANTENNA SENSOR

(75) Inventors: Haiying Huang, Arlington, TX (US); Srikar Deshmukh, Chandler, AZ (US)

(73) Assignee: Board of Regents, The University of Texas System, Austin, TX (US)

( * ) Notice: Subject to any disclaimer, the term of this patent is extended or adjusted under 35 U.S.C. 154(b) by 111 days.

(21) Appl. No.: 12/878,953

(22) Filed: Sep. 9, 2010

(65) Prior Publication Data
US 2012/0109560 A1 May 3, 2012

Related U.S. Application Data

(63) Continuation-in-part of application No. 12/867,801, filed as application No. PCT/US2009/034175 on Feb. 15, 2009.

(51) Int. Cl.
*G01R 23/00* (2006.01)
(52) U.S. Cl.
USPC ............... 702/75; 702/66; 702/76; 702/77
(58) Field of Classification Search
USPC .............................. 702/66, 75–77
See application file for complete search history.

(56) References Cited

U.S. PATENT DOCUMENTS

| | | | |
|---|---|---|---|
| 3,888,115 A | | 6/1975 | Schwartz |
| 5,276,629 A | * | 1/1994 | Reynolds ............ 702/71 |
| 5,970,393 A | | 10/1999 | Khorrami et al. |
| 6,910,384 B2 | | 6/2005 | Tomka et al. |
| 7,006,044 B2 | | 2/2006 | Choi et al. |
| 2007/0151356 A1 | | 7/2007 | Sumigawa et al. |
| 2007/0186668 A1 | | 8/2007 | Garverick et al. |
| 2007/0276294 A1 | | 11/2007 | Gupta et al. |

FOREIGN PATENT DOCUMENTS

| | | |
|---|---|---|
| EP | 1613921 | 8/2007 |
| WO | 2009103042 | 8/2009 |

OTHER PUBLICATIONS

Tata et al. "Exploiting a patch antenna for strain measurements", Meas. Sci. Technol., 20:1-7 (Nov. 12, 2008).
Deshmukh et al. "Crack Detection and Monitoring Using Passive Wireless Sensor", ASME Conference (2009).
Tata et al. "Bio-inspired sensor skins for structural health monitoring", Smart Mater. Struct., 18:10 (2009).
Mohammad et al. "Monitoring fatigue crack growth and opening using antenna sensors", Smart Mater. Struct., 19:1-8 (2009).
Deshmukh et al. "Antenna sensor skin for fatigue crack detection and monitoring", Smart Struct. Systs., 8(1):93-105 (2011).

* cited by examiner

*Primary Examiner* — Mischita Henson
(74) *Attorney, Agent, or Firm* — Parks IP Law LLC; Jennifer P. Medlin, Esq.

(57) ABSTRACT

The condition of a structure using remote interrogation of a multi-state passive wireless antenna sensor that has a known resonant frequency when mounted on the structure. The passive wireless antenna sensor is connected to a remotely operated switching circuit that includes a photocell. An interrogation system transmits a series of radio frequency signals with sweeping frequencies around the known resonant frequency to the passive wireless antenna sensor, while simultaneously pulsing a laser to switch the passive wireless antenna sensor between a first state and a second state in which it is exposed to open-circuit or short-circuit conditions. A signal is reflected from the passive wireless antenna sensor in each of the first and second states, and a resonant frequency of the passive wireless antenna sensor is determined by normalizing the received signals to isolate the antenna mode.

17 Claims, 8 Drawing Sheets

REMOTE INTERROGATION OF A PASSIVE WIRELESS ANTENNA SENSOR

CROSS-REFERENCE TO RELATED APPLICATIONS

This application is a continuation-in-part of U.S. patent application Ser. No. 12/867,801 (entitled Passive Wireless Antenna Sensor for Strain, Temperature, Crack and Fatigue Measurement), filed 16 Aug. 2010, the entirety of which is incorporated by reference. This application also incorporates by reference the entirety of U.S. Provisional Patent Application No. 61/226,347 (System, Method, and Apparatus for Passive Wireless Structural Health Monitoring), filed 17 Jul. 2009.

STATEMENT REGARDING FEDERALLY-SPONSORED RESEARCH OR DEVELOPMENT

This invention was developed as part of a project funded by the Air Force Office of Scientific Research—Grant No. FA9550-08-1-0317.

FIELD OF INVENTION

The present invention relates generally to the field of monitoring and sensing devices, systems and methods, and more particularly, to a remotely interrogated passive wireless antenna sensor for measuring strain, temperature, crack and fatigue in physical structures.

BACKGROUND OF THE INVENTION

There are many actual and potential applications that benefit from monitoring and measurement of the physical conditions of various materials to determine the health and integrity of the underlying structure.

For example, an increasing number of aircraft are operating beyond their useful life expectancy. It is critical to ascertain which of their components are subject to strain, deflection, and growth of fatigue cracks, which dramatically reduce the integrity of the aircraft structures. The impact of multiple cracks on aircraft structural integrity depends not only on the local stress state, but is also strongly influenced by the crack pattern and crack geometries. To accurately predict the residual lifespan of affected service components, detailed characterizations of the cracks are absolutely essential.

As another example, in the past several decades, many researchers have been actively pursuing development of engineered sensor skins, defined as expansive flexible membranes densely embedded with distributed sensors. Sensor skins could enable an engineered system to approximate the self-protecting mechanism of bio-systems, as "feeling pain" provides early warnings to prevent further damage to an underlying structure. Other applications for sensor skins include wearable healthcare, telepresence, and aerodynamic monitoring.

Many different types of sensors have been developed to indirectly detect abnormalities and potentially damaging conditions based on their impact on the strain field, ultrasound wave propagation or vibration characteristics of a structure. Sensors using radio-frequency identification (RFID), piezoelectric materials and optical fiber sensors have been used extensively.

However, existing wireless sensors that have separate sensing units and wireless transmitting units transmit a sensor signal, usually in digital form, that has to be converted into a radio frequency (RF) signal to be transmitted. As a result, electrical power has to be supplied to such wireless sensors via an onboard power supply such as a battery, which limits the sensor's life span and increases cost, size and complexity. To overcome the power consumption problem, passive or self-powered sensors were proposed. The most popular passive wireless sensors are based on Surface Acoustic Wave (SAW), although these sensors are not very power efficient because of the double conversion of RF waves to elastic waves. Moreover, the substrate of a SAW sensor must be piezoelectric. Another type of passive wireless sensor utilizes an inductive coil antenna to broadcast a resonant frequency, a shift in which is caused by impedance changes induced by the measurand. However, sensors that utilize inductive coupling have a very limited range of operation due to high coupling losses. Crack detecting sensors that utilize piezoelectric materials have low power efficiency and operate in a limited range of temperatures. In addition, most of these sensors are point sensors and their spatial resolution is limited due to the limited number of sensors that can be deployed. Optical fiber based sensors provide a promising alternative that can provide distributed strain sensing for crack detection with good spatial resolution; however, optical fiber based sensors are expensive and delicate.

SUMMARY OF THE INVENTION

The present invention provides systems and methods for remotely interrogating unpowered (passive) wireless antenna sensors. Because the passive wireless antenna sensor can be interrogated remotely, it does not require power to operate, which advantageously provides for direct damage detection, high sensitivity, high density placement, fine spatial resolution, low profile, light weight, low fabrication cost, and conformability.

The passive wireless antenna sensor can be used, for example, to measure one or more parameters, such as strain, temperature, crack, and fatigue, of a wide variety of structures containing metallic, non-metallic, composite, concrete and even living tissue. More specifically, the systems and methods described are particularly useful in applications that require measurement of parameters such as: (a) strain in the structure by measuring a frequency shift of the resonant frequency of a passive wireless antenna sensor; (b) temperature change of the structure by measuring the frequency shift; (c) cracks in the structure by measuring the frequency shift and an increase in return loss; and/or (d) fatigue in the structure by measuring an increase in induced return loss. Several advantages have been found by using passive wireless antenna sensors in these and any other known or yet to be developed applications, including their ability to operate without an external power source, small size, low manufacturing cost, low profile, light weight, conformability to surfaces and networking capability.

Accordingly, methods of monitoring a condition of a structure using the passive wireless antenna are described. Monitoring involves interrogating the passive wireless antenna sensor, and analyzing a response signal that emanates from the passive wireless antenna sensor.

In accordance with one aspect, the systems and methods described are particularly useful for interrogation of a passive wireless antenna sensor that has one or more known characteristics, such as a resonant frequency or return loss, when mounted on a particular structure. A change in the condition of the structure will cause a change in one or more of the characteristics of the passive wireless sensor. Non-limiting examples of passive wireless antenna sensors include a patch antenna, a loop antenna, or a microstrip antenna. In certain embodiments, the passive wireless antenna sensor is a patch antenna that includes a dielectric substrate disposed between an antenna pattern and a ground plane. In certain embodiments, the structure being monitored is a part of the passive wireless antenna sensor and serves as a ground plane for the passive wireless antenna sensor.

To monitor structural conditions, the passive wireless antenna sensor is interrogated remotely. The term remotely indicates that the interrogation is performed without physical contact, and in particular, without wired connection to the passive wireless antenna sensor. In certain embodiments, remote interrogation is accomplished by transmitting a series of radio frequency (RF) signals with sweeping frequencies around the known resonant frequency to the passive wireless antenna sensor. In response to this interrogation, the passive wireless antenna sensor reflects a signal, which is primarily backscattering of the broadband RF electromagnetic (EM) waves that it receives as it is interrogated. A resonant frequency of the passive wireless antenna sensor is determined based on the received response signal. The condition of the structure is ascertained by comparing the determined resonant frequency of the passive wireless antenna sensor to the known resonant frequency of the passive wireless antenna sensor. A change in the resonant frequency of the passive wireless antenna sensor indicates a change in the condition of the structure.

The backscattered response signal includes two components, which will be designated the antenna mode and the structure mode. The structure mode returns waves that are backscattered from the physical components of the passive wireless antenna sensor. Conversely, the antenna mode returns the re-radiated waves of the interrogation signal received by the antenna due to mismatched antenna load. It is the antenna mode that exhibits the measured radiation characteristics of the passive wireless antenna sensor, which can be related to associated physical parameters such as strain, presence of cracks, temperature, deflection, fatigue, and the like. However, the amplitude of the antenna mode is much less than that of the structural mode, which would frustrate extraction and analysis of the spectrum of the antenna mode.

Accordingly, response signal analysis includes methods for analyzing the received response signal by normalizing the antenna mode of the response signal. The antenna mode is isolated from the backscattered signal by interrogating the passive wireless antenna sensor in two or more different states that have been selected to yield a predictable disparity in the measured characteristics of either or both the antenna mode and the structural mode. In certain embodiments, this is accomplished by measuring the received response signal with the passive wireless antenna sensor switched to a first state, measuring the received response signal with the passive wireless antenna sensor switched to a second state, and then normalizing the response signal as the difference between the measured response signals, where the first state and the second state are selected to yield a disparity in the phase shift of the antenna mode. For example, the first state involves switching the passive wireless antenna sensor to an open-terminated condition, and the second state involves switching the passive wireless antenna sensor to a short-terminated condition. For these two impedance loads, the antenna mode signal experiences a 180 degree phase shift, while the phase of structural mode is unaffected. Therefore, by subtracting the measured response signals at these two states, the resultant antenna mode component is identifiable as it doubles in amplitude as compared to the antenna mode at each of the two states, and the structural mode component is cancelled out.

To obtain measurements of the response signal with the passive wireless antenna sensor in multiple different states, while maintaining the objective of wirelessly interrogating the passive wireless antenna sensor, the methods of the present invention involve remotely switching the passive wireless antenna sensor between the various states. To that end, the passive wireless antenna sensor is switched using a compact low voltage switching circuit that can be mounted on the same substrate, and that is remotely controllable. An example of a suitable compact normalization switching circuit includes a high frequency pseudomorphic high electron mobility transistor (pHEMT) that is switched using a photocell that is activated remotely by a LASER or other suitable light source. The photocell may operate according to the principles inherent to photoresistors, photodiodes and phototransistors and the like.

The present invention also provides an apparatus for monitoring a condition of a structure. The monitoring apparatus include an interrogation system and a signal analyzer. The interrogation system includes an RF source and a transceiver that respectively generates and transmits the series of RF signals with sweeping frequencies around the known resonant frequency to the passive wireless antenna sensor. The interrogation system also includes a receiver that receives a signal reflected from the passive wireless antenna sensor. For example, the interrogation system may include a non-contact antenna reader that includes transceiver (i.e., with both transmitter and receiver functions) that works in concert with the RF source (e.g., a network analyzer, scanning RF source or a broadband RF source with frequency demodulation). Non-limiting examples of non-contact antenna readers that are suitable for use with the present invention include: a horn antenna, a patch antenna, a loop antenna or a lens antenna.

The signal analyzer of the monitoring apparatus determines a resonant frequency of the passive wireless antenna sensor based on the reflected signal. In one aspect, the resonant frequency of the passive wireless antenna sensor is remotely measured by backscattering to detect the return loss as a function of frequency while in certain other embodiments, return loss is directly measured by a frequency analyzing apparatus. The signal analyzer may include an integral or associated processor and memory elements, such as a computer-readable medium, as well as any other components necessary for user interaction via input/output devices, display mechanisms, permanent and temporary storage and access of data, and the like.

Advantageously, the interrogation system also includes a means for activating a switching circuit that changes the state of the passive wireless antenna sensor to enable the signal analyzer to normalize the antenna mode portion of the received signal. For example, means for activating the switching circuit may be a LASER or other electromagnetic pulse generator for selectively illuminating a photocell. Those skilled in the art will readily appreciate that the choice of means for selectively activating the switching circuit will vary according to the nature of the switching circuit. For example, a LASER is appropriate as means for activating a photocell driven switching circuit, while magnetic, acoustic or thermal pulse generators may be appropriate for certain other switching circuits.

The foregoing has broadly outlined some of the aspects and features of the present invention, which should be construed to be merely illustrative of various potential applications of the invention. Other beneficial results can be obtained by applying the disclosed information in a different manner or by combining various aspects of the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

BRIEF DESCRIPTION OF THE DRAWINGS

Further benefits and advantages of the present invention will become more apparent from the following description of various embodiments that are given by way of example with reference to the accompanying drawings.

DESCRIPTION OF THE INVENTION

As required, detailed embodiments of the present invention are disclosed herein. It must be understood that the disclosed embodiments are merely exemplary, in that they are examples of the invention that may be embodied in various and alternative forms, and combinations thereof. Thus, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

As will be described in more detail below, the present invention provides systems and methods for remotely interrogating passive wireless antenna sensors that can be used to measure parameters that correspond to the condition of a structure that is being monitored. Generally, the systems and methods involve deployment and operation of one or more multi-state passive wireless antenna sensors and at least one remote monitoring apparatus that includes an interrogation system and a signal analyzer. For purposes of teaching, and not of limitation, the systems and methods will be described using an exemplary single patch antenna as the passive wireless antenna sensor. Nevertheless, the passive wireless antenna sensor can be a patch antenna, a loop antenna, a microstrip antenna or any other suitable antenna.

Multi-State Passive Wireless Antenna Sensor

Figure 1:
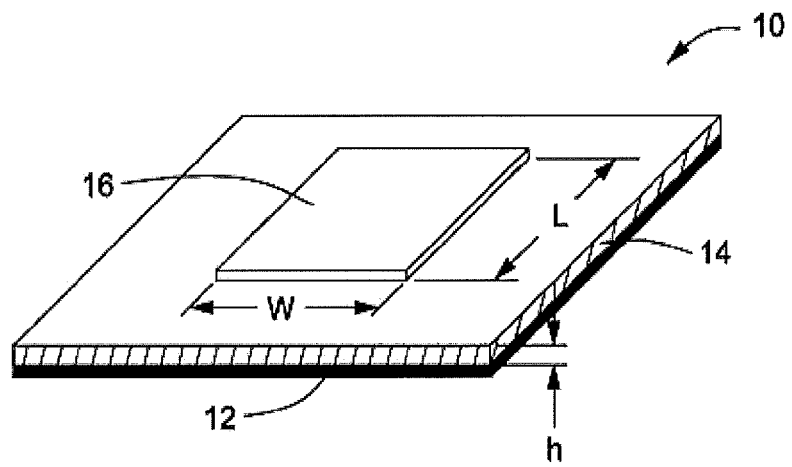
FIG. 1 shows an exemplary passive wireless antenna sensor in accordance with certain embodiments of the present invention.

Now referring to FIG. 1, a diagram of a typical millimeter-wave patch antenna 10 is shown. The patch antenna 10 includes a rectangular patch 16 fabricated on a thin sheet of low-loss insulating material, called the dielectric substrate 14. The dielectric substrate is preferably flexible so that the patch antenna 10 can conform to the shape of the structure being monitored. The rectangular patch 16 can be metallic or a wire/metallic loop printed on one side of the substrate 14. The shape of the antenna pattern can vary depending on the desired operating parameters. A ground plane 12 is coated on the opposite side of the dielectric substrate 14 from the metallic patch 16. The metallic patch 16 and the ground plane 12 form an electro-magnetic (EM) cavity so that a resonance can be generated and the fringing field between the ground plane 12 and the metallic patch 16 can efficiently radiate, Note that the ground plane 12 can be modified or eliminated if the structure on which the patch antenna 10 is to be mounted has a metallic or semi-metallic surface sufficient to function as the ground plane 12.

Figure 2:
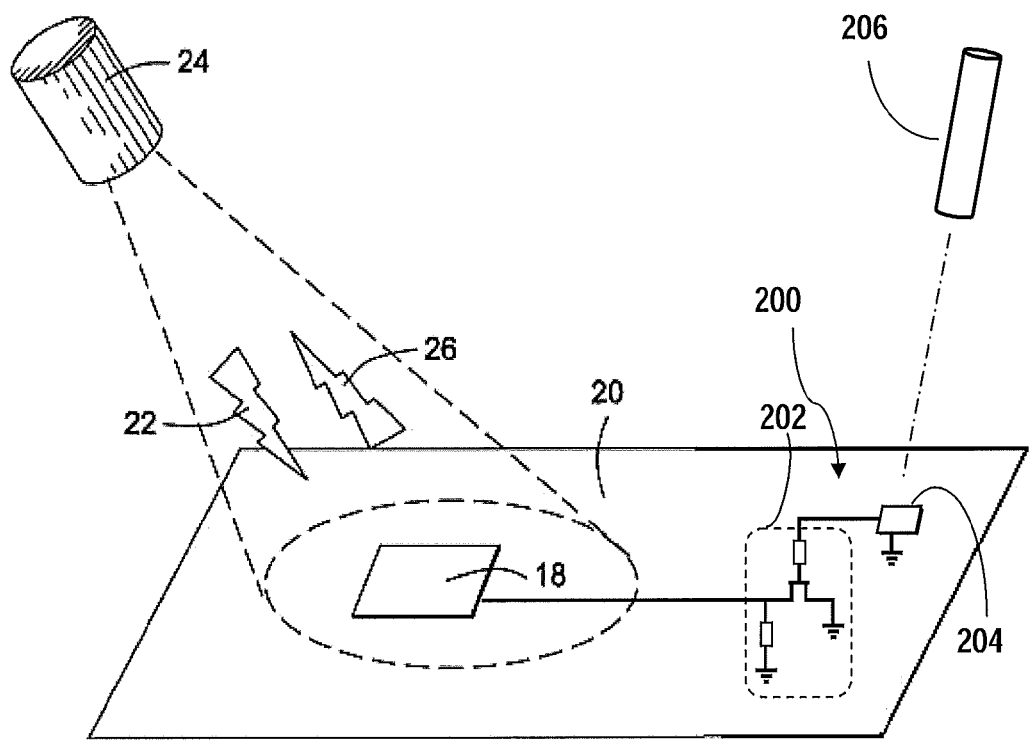
FIG. 2 shows an exemplary system for switching and interrogating a passive wireless antenna sensor and receiving a backscattered response signal.

Referring now to FIG. 2, the passive wireless antenna sensor 18 can be a patch antenna 10, a loop antenna, a microstrip antenna or other suitable antenna. The passive wireless antenna sensor 18 is mounted on a structure 20 to be monitored, which may be for example, any component or surface of a building, bridge, sensor skin, biomedical device, mechanical equipment, vehicle, part of a living body, or the like. As previously mentioned, the passive wireless antenna sensor 18 is preferably made of a flexible material so that the passive wireless antenna sensor 18 can conform to the shape of the structure 20 being monitored.

Passive wireless antenna sensor 18 return loss is defined generally as the ratio between the amplitudes of the reflected wave 26 and the incident wave 22, while the antenna resonant frequency is defined as the frequency at which the passive wireless antenna sensor 18 has the minimum return loss.

Figure 3A:
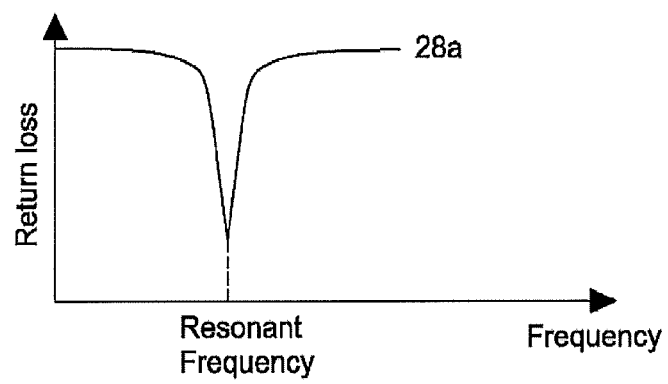
FIGS. 3A-3B are graphs illustrating the detection of cracks from the radiation parameters of a passive wireless antenna sensor in accordance with the present invention.
Figure 3B:
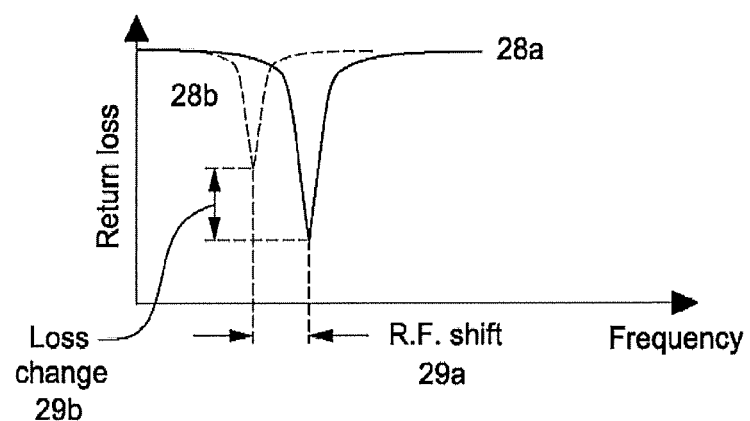

The passive wireless antenna sensor 18 has one or more known characteristics, such as resonant frequency or return loss, when it is mounted on a particular structure. A typical return loss versus frequency diagram of a passive wireless antenna sensor 18 is shown in FIGS. 3A and 3B. As shown in FIG. 3A, a passive wireless antenna sensor 18 generally has a narrow frequency response bandwidth. Therefore, the passive wireless antenna sensor 18 can only backscatter EM waves whose frequencies fall within a narrow frequency band. Outside of the resonant frequency band, the passive wireless antenna sensor 18 is substantially invisible to the reader 24.

The frequency response of the passive wireless antenna sensor 18 is dependent on the characteristics of the passive wireless antenna sensor 18: (a) the dimensions of the passive wireless antenna sensor 18; (b) the dielectric properties of the passive wireless antenna sensor 18 (e.g., substrate 14); (c) the surface roughness of the antenna pattern (e.g., metal patch 16); and (d) the presence of a crack in the ground plane 12 caused by a crack in the structure 20 (or a crack in the metallic structure 20 that is performing the function of the ground plane 12) to which the passive wireless antenna sensor 10 is mounted. FIG. 3B illustrates two possible modulations of the antenna radiation parameters: (a) resonant frequency shift 29a (change in frequency between a known resonant frequency 28a and a determined (detected) resonant frequency 28b); and (b) a return loss change 29b (change in return loss between a known resonant frequency 28a and a determined (detected) resonant frequency 28b). That the known resonant frequency can be: (a) an original resonant frequency of the passive wireless antenna sensor when the passive wireless antenna sensor was mounted on the structure; or (b) one or more previously determined resonant frequencies of the passive wireless antenna sensor. The resonant frequency shift 29a can be used for strain measurement and temperature measurement. The resonant frequency shift 29a and return loss change 29b can be used for crack detection. The return loss change 29b can be used for fatigue detection.

To enable multi-state operation, the passive wireless antenna sensor 18 also is connected to or incorporates a remotely activated switching circuit 200 (FIG. 2). The switching circuit 200 can be activated to selectively change the state of the passive wireless antenna sensor 18. Any suitable remotely controllable device can be included in the switching circuit 200, including but not limited to, the exemplary combination of a switch component (pseudomorphic High Electron Mobility Transistor (pHEMT) 202) that is activated or deactivated (energize or de-energized) using any suitable circuit-breaking means, such as photocell 204. Alternatively, the switching circuit 200 may utilize other remotely operable compact low voltage circuit-breaking means, including those activated by magnetic, thermal, or acoustic stimuli. The exemplary switching circuit 200 is connected to the passive wireless antenna sensor 18 via a microstrip transmission line.

The pHEMT 202 and the photocell 204 are mounted on the same structure 20 as the passive wireless antenna sensor 18 (as shown in FIG. 2), and may be mounted directly on the substrate 14 of a patch antenna 10.

The switching circuit 200 enables interrogation of the passive wireless antenna sensor 18 in multiple states. At a first state, the photo cell 204 is not illuminated, and the pHEMT 202 is on. In this first state, the drain-source junction of the pHEMT acts as a short circuit, and so, the passive wireless antenna sensor 18 is short-terminated. When the photo cell 204 is illuminated with an electromagnetic pulse generator 206 (e.g., a LASER), a small voltage is generated, which drives the pHEMT gate-source junction to turn the pHEMT 202 off. In this second state, the drain-source junction of the pHEMT 202 acts as an open circuit whereby the passive wireless antenna sensor 18 is effectively open-terminated, Parallel high impedance resistors (e.g., 100 kΩ) are placed in the exemplary switching circuit 200 to block microwave signals from entering the DC bias.

Remote Interrogation Systems and Methods

The radiation parameters of a passive wireless antenna sensor 18 can be measured via a non-contact reader, based on the principle of backscattering. The passive wireless antenna sensor 18 is placed in the path of a non-contact reader 24 (or vice versa) that serves as both the transmitter and the receiver (e.g., a transceiver). The reader 24 can be a fixed, portable or handheld device. As a transmitter, the reader 24 sends an incident electromagnetic (EM) wave 22 toward the passive wireless antenna sensor 18. Upon interception by the passive wireless antenna sensor 18, the incident wave 22 is scattered back as a reflected wave 26 by the passive wireless antenna sensor 18 if the frequency of the incident wave substantially corresponds to the resonant frequency of the passive wireless antenna sensor 18. The backscattered or reflected wave 26 is then received by the reader 24. From the amplitude and the frequency of the reflected wave 26, the antenna radiation parameters (resonant frequency, return loss, etc.) can be measured. The reader 24 may be configured to measure the antenna radiation parameters continuously, periodically, randomly or as initiated by a user.

Figure 4:
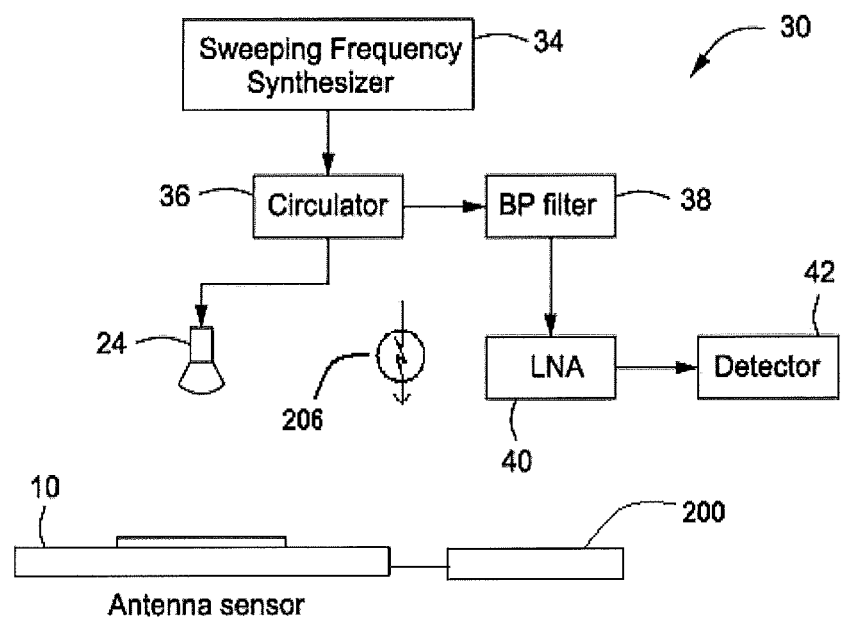
FIG. 4 shows an exemplary passive wireless antenna sensor resonant frequency measurement system in accordance with the present invention.

Referring again to both to FIG. 2 and FIG. 3B, the present invention provides an apparatus and a method of monitoring a condition of a structure 20 by interrogating a passive wireless antenna sensor 18 having a known resonant frequency 28a when mounted on the structure 20, and by then analyzing signals reflected from the passive wireless antenna sensor 18 when the passive wireless antenna sensor 18 is in two or more different states. Referring now also to FIG. 4, the interrogation system 30 of the monitoring apparatus includes a non-contact antenna reader 24, which in turn includes an RF source 34. In the embodiment shown, the RF source 34 is a sweeping frequency synthesizer, which generates a series of RF signals 22 with frequencies centered at the resonance frequency of the unloaded passive wireless antenna sensor 18 through a circulator 36. The antenna reader 24 includes transceiver functionality that enables it to transmit the series of radio frequency (RF) signals 22 to the passive wireless antenna sensor 18 and to receive the reflected signal.

The interrogation system 30 can be used to wirelessly measure the resonant frequency shift of the passive wireless antenna sensor 18. An antenna reader 24 includes a transceiver that transmits and detects a signal from the passive wireless antenna sensor 18, and the data is then sent to a band-pass filter 38, after which the backscattered signal will be amplified at low noise amplifier (LNA) 40 and detected by a RF power detector 42. Only when the transmitting signal matches with the resonant frequency of patch passive wireless antenna sensor 18 under test, the detector 42 will receive a large backscattered signal. At other frequencies, only noise is detected.

The antenna reader 24 receives a signal 26 from the passive wireless antenna sensor 18 and determines a resonant frequency 28b of the passive wireless antenna sensor 18 based on the received signal 26. Generally, the determined resonant frequency 28b of the passive wireless antenna sensor 18 is compared to the known resonant frequency 28a of the passive wireless antenna sensor 18. A change in the resonant frequency of the passive wireless antenna sensor 18 indicates a change in the condition of the structure 20.

The interrogation system also include means for activating switching circuit (depicted in FIG. 2 as LASER 206), whereby the passive wireless antenna sensor state is selectively changed.

The various embodiments of the invention incorporate the principle of multi-state interrogation of the passive wireless antenna sensor 18. Consequently, the exemplary interrogation system performs interrogation methods that involve measuring the reflected signal before and after activating the switching circuit 200 by transmitting a pulse from LASER 206 to energize the circuit breaking means (photocell 204). In this manner, the interrogation system measures the reflected signal with the passive wireless antenna sensor 18 in both the first and the second states.

Signal Analysis

Figure 5:
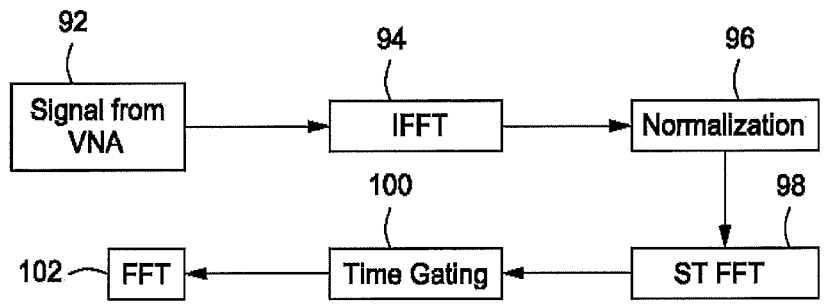
FIG. 5 shows a block diagram of an exemplary procedure for signal processing in accordance with certain embodiments of the present invention.
Figure 6:
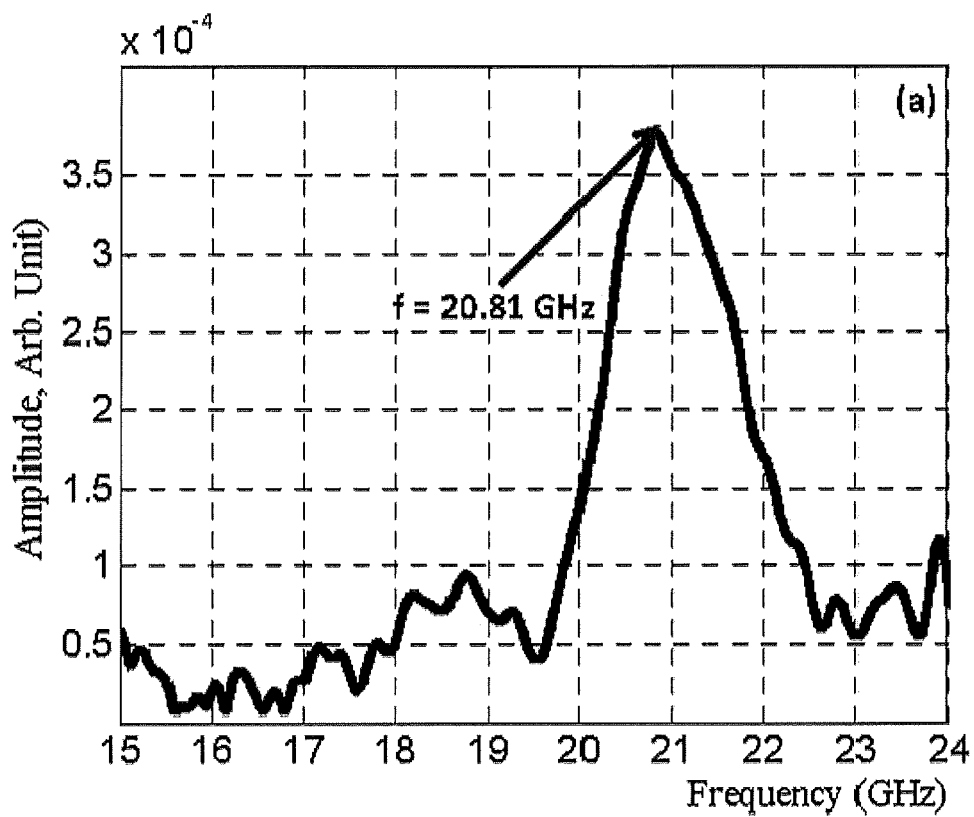
FIG. 6 is a graph illustrating identification of the resonant frequency of an exemplary passive wireless antenna sensor, after signal processing in accordance with the present invention.

To measure the resonant frequency of the passive wireless antenna sensor from the backscattered signals reflected by the antenna reader 24, digital signal processing methods are presented. With reference to FIG. 5, a 92, the reflected signals are received by the antenna reader. These reflected frequency domain signals are converted, at 94, to time domain signal using Inverse Fast Fourier Transformation (IFFT). The resultant time domain signal measured with the passive wireless antenna sensor 18 in the first state (i.e., with a short load) is stored as the reference signal. The resultant time domain signal measured with the passive wireless antenna sensor 18 switched to the second state (i.e., with an open load) is then normalized, at 96, using this reference signal. Subsequently, the spectrogram of the normalized signal can be calculated using a Short Time Fourier Transform (STFT), at 98. To isolate the antenna mode component, the normalized signal is time gated, at 100, Performing Fast Fourier Transformation (FFT) on the time gated signal, at 102, then reveals the spectrum of the signal backscattered by the antenna sensor. As shown in FIG. 6, the resonant frequency of the passive wireless antenna sensor 18 can be identified as the frequency at which the amplitude peak is located.

Example

Application to Crack Detection

Figure 7:
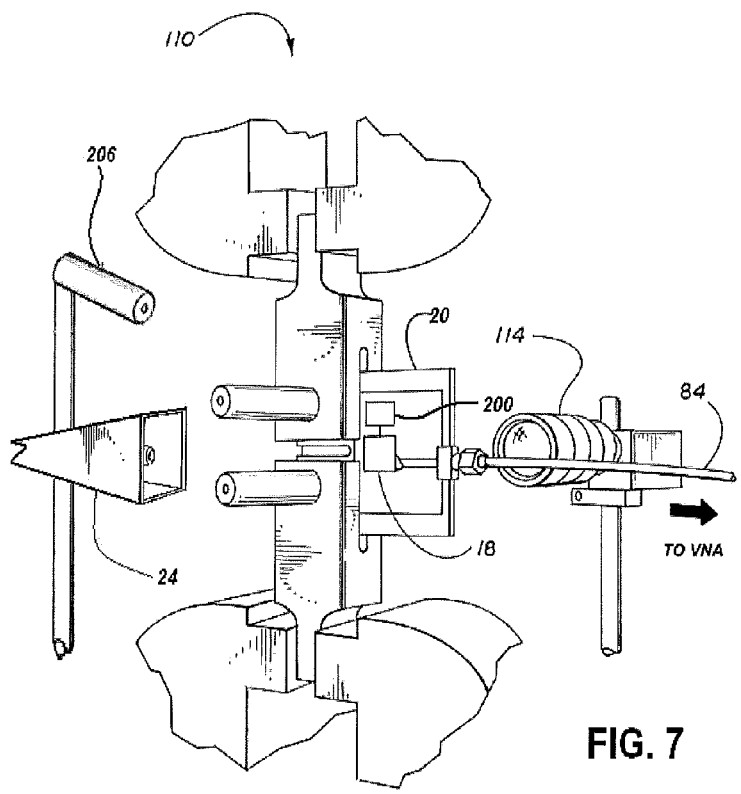
FIG. 7 shows an experimental setup for crack detection using a passive wireless antenna sensor in accordance with the present invention.

An experimental implementation of the remote interrogation system 80 is now described with reference to FIG. 7, which shows a fatigue specimen that is mounted on a mechanical testing frame using clevises and pins. The passive wireless antenna sensor 18 is mounted onto the fatigue specimen structure 20, which is subjected to fatigue loading to create and advance a crack in the fatigue specimen. The remote-activated microwave switching circuit 200 is implemented on a KAPTON polyimide film substrate next to the passive wireless antenna sensor 18. A charge-coupled device (CCD) camera 114 is placed facing the opposite side of the passive wireless antenna sensor 18. Digital images of the cracked region of the fatigue specimen are acquired, processed by a computer (not shown) and displayed on a monitor (not shown) to track the crack propagation. The passive wireless antenna sensor 18 is interrogated wirelessly using an antenna reader 24 that includes a monostatic radar transceiver system (comprised of suitable components, such as the SINGER A6100 interrogating horn antenna). For example, a horn antenna placed in front of the passive wireless antenna sensor 18 can be connected to a Vector Network Analyzer (VNA) (not shown) that is configured to sweep from 5 GHz to 9 GHz in 8000 points. The VNA is calibrated with its reference plane at the end of a cable 84 to determine the appropriate power output of the VNA.

A light source, such a LASER pulse generator 206, is used to illuminate the photocell and thus activate its impedance switching functionality. The brightness of the light source was adjusted to maintain a −1.5 volt gate-to-source voltage for the pHEMT. The light source is triggered using the computer's parallel port through a relay. It should be noted that both the pulse generator 206 and the antenna reader 24 are directed toward the plane of the fatigue specimen so as to be pointed substantially directly at the photocell 204 of the switching circuit 200 and the passive wireless antenna sensor 18, respectively.

Here, the passive wireless antenna sensor 18 has two fundamental radiation modes, so a dual polarization horn antenna is employed as the antenna reader 24 so that both antenna radiation modes can be measured by changing the polarization of the horn antenna to match the electrical field of the antenna radiation mode.

The structure 20 of the fatigue specimen is subjected to controlled fatigue loading and measurements are taken. Each measurement consists of two steps. The spectrum of the backscattered signal that is the reflected response of the passive wireless antenna sensor 18 is first measured when the pulse generator 206 (light source) is turned OFF. At this state, the pHEMT 202 is in saturation mode and the passive wireless antenna sensor 18 is in a first state, i.e., shorted to the ground. The pulse generator 206 (light source) is then turned ON to bias the pHEMT into the cut-off mode and thus terminate the passive wireless antenna sensor 18 in open circuit (a second state). The VNA is again triggered to collect the spectrum of the backscattered signal. The measured spectra are downloaded from the VNA to a computer for data processing.

Figure 8:
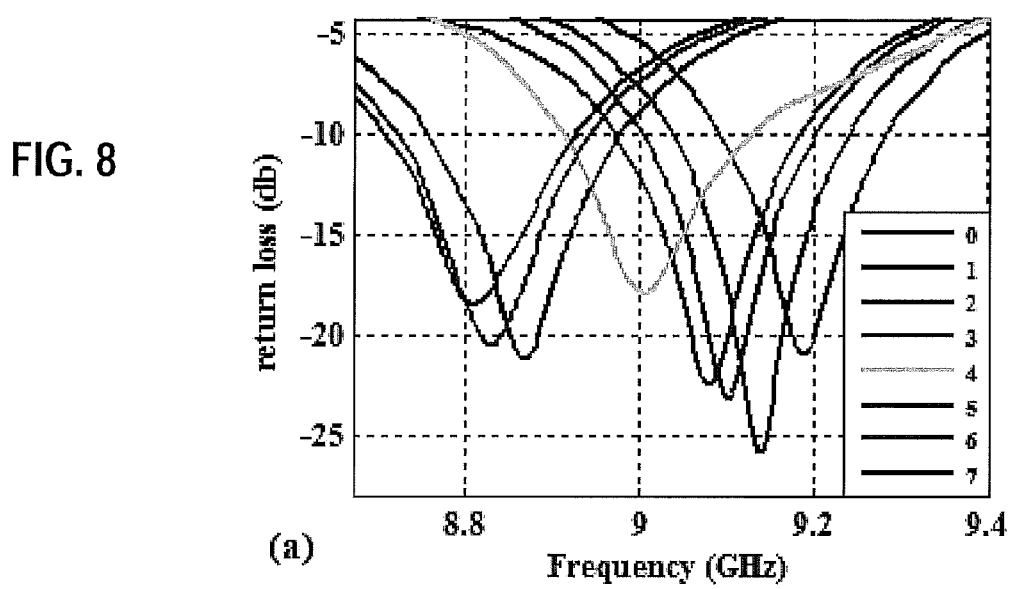
FIG. 8 is a graph showing the resonant frequency shift on a passive wireless antenna sensor used to detect crack growth.
Figure 9:
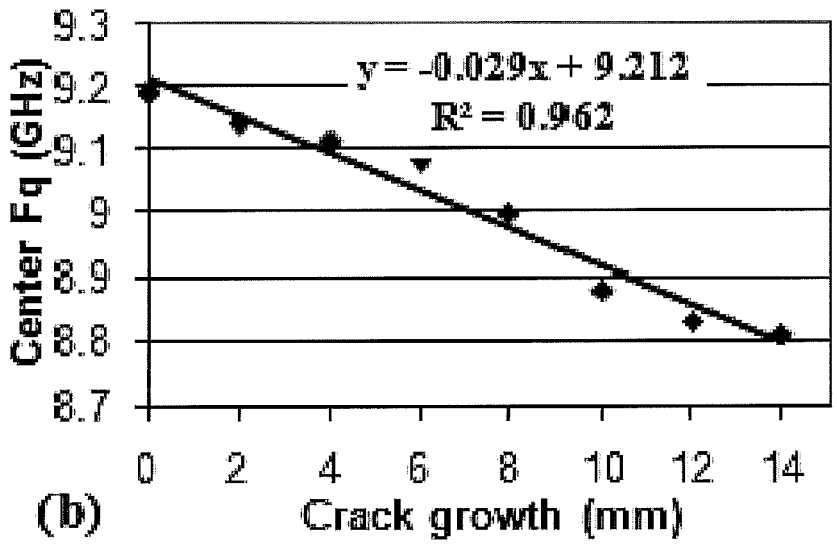
FIG. 9 is a graph illustrating crack growth as compared to resonant frequency shift.

The S11 curves of the antenna sensor at multiple different predetermined crack lengths are shown in FIG. 8. Position 0 indicates when the crack tip just reached the antenna patch. Each subsequent position increment is equivalent to 2 mm of crack growth. As expected, the f10 of the passive wireless antenna sensor 18 shifted towards lower frequencies as the crack length increased. To determine the sensitivity of the passive wireless antenna sensor 18 to the crack length, the resonant frequency shift of the antenna sensor is plotted versus the crack growth, as shown in FIG. 9. The relationship between the resonant frequency shift and the crack growth appeared to be linear. In this example, based on the linear fitting of the experimental data, the crack-growth sensitivity of the passive wireless antenna sensor 18 is estimated to be 29.6 MHz/mm. Considering that a VNA has a spectral resolution of 10 Hz, crack detection with a sub-millimeter resolution can be easily achieved using the antenna sensor.

Figure 10:
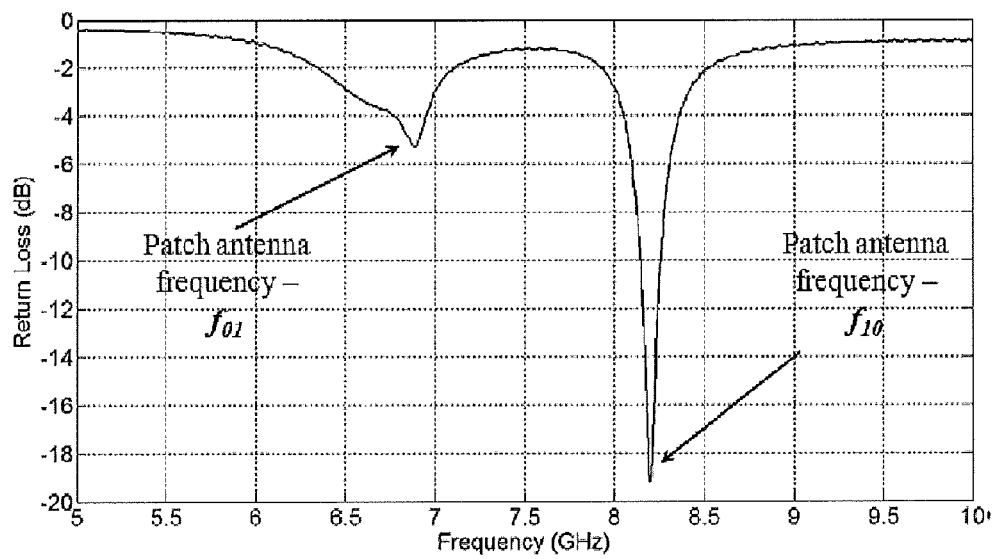
FIG. 10 is a graph that illustrates the fundamental resonant frequencies of an exemplary passive wireless antenna sensor.
Figure 11A:
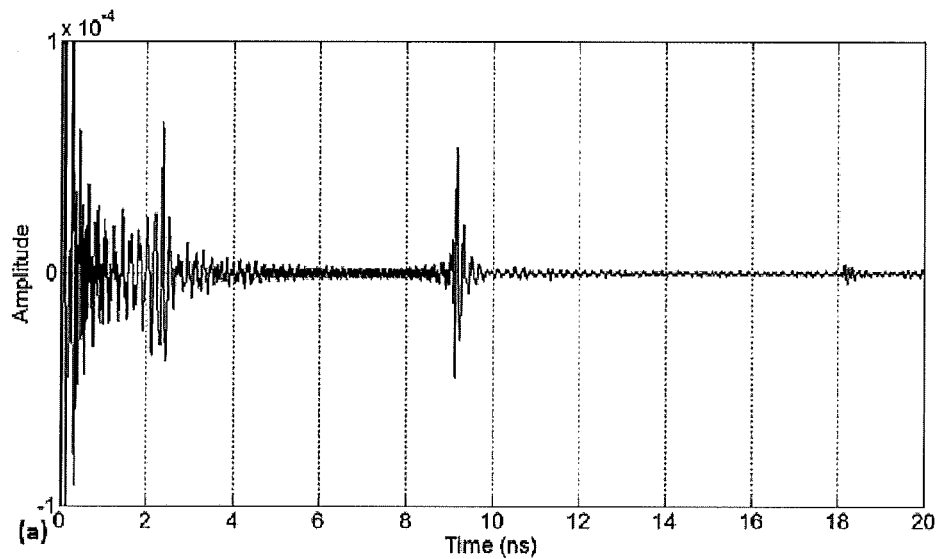
FIGS. 11a and 11b are graphs that illustrate the reflected signal from an exemplary passive wireless antenna sensor measured in a first state and in a second state, in accordance with the present invention.
Figure 11B:
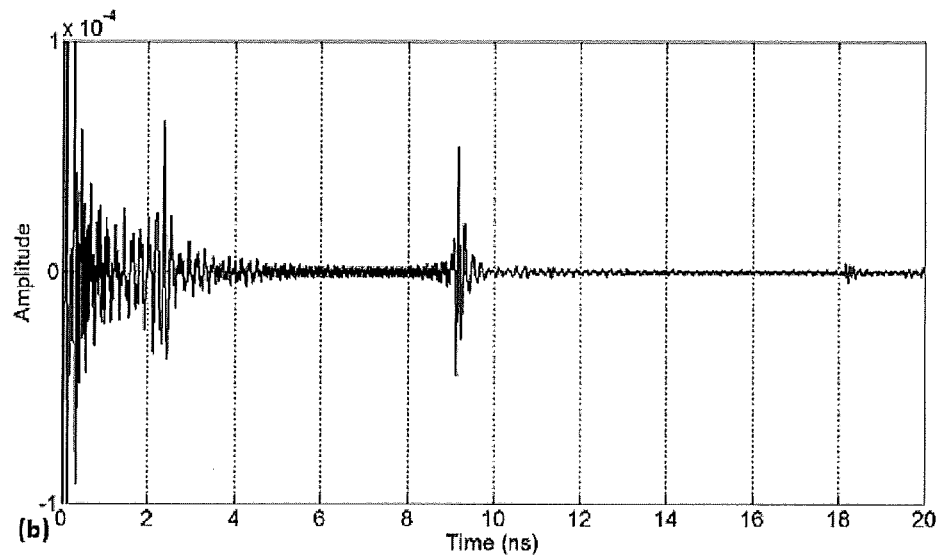

The S11 parameter plot of the experimental antenna sensor was measured to characterize the patch antenna, as shown in FIG. 10. The horn antenna was first polarized along the width of the passive wireless antenna sensor 18 to measure the f10 frequency. The frequency domain backscatter signal acquired by the VNA was converted to time domain signal using Inverse Fast Fourier Transform (IFFT). The two time-domain backscatter signals acquired when the passive wireless antenna sensor 18 was open-terminated and short-terminated are shown in FIG. 11a and FIG. 11b respectively. Because these two signals are dominated by the structural mode, they looked almost identical. The wave packet at 0 ns is due to the internal reflections from the interrogating horn antenna. The large wave packet at 2 ns is due to the reflections from the VNA chassis. The third wave packet at 9 ns is due to the structure mode response of the passive wireless antenna sensor 18 and the large metallic structure. The small wave packet at 18 ns is due to the reflection from the wall. Antenna mode wave packet is too weak to be visible in FIG. 11a/b.

Figure 12:
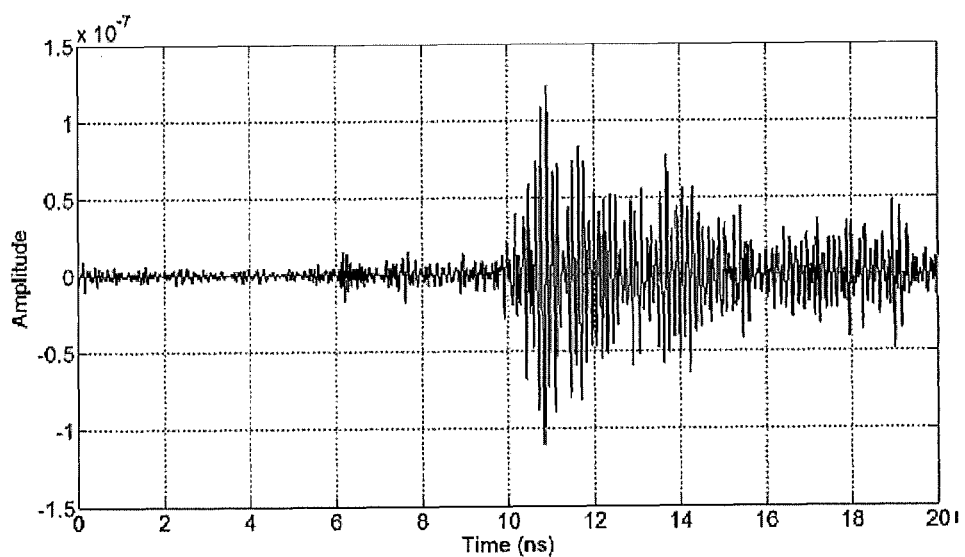
FIG. 12 is a graph that illustrates a normalized backscatter signal, in accordance with the present invention.
Figure 13:
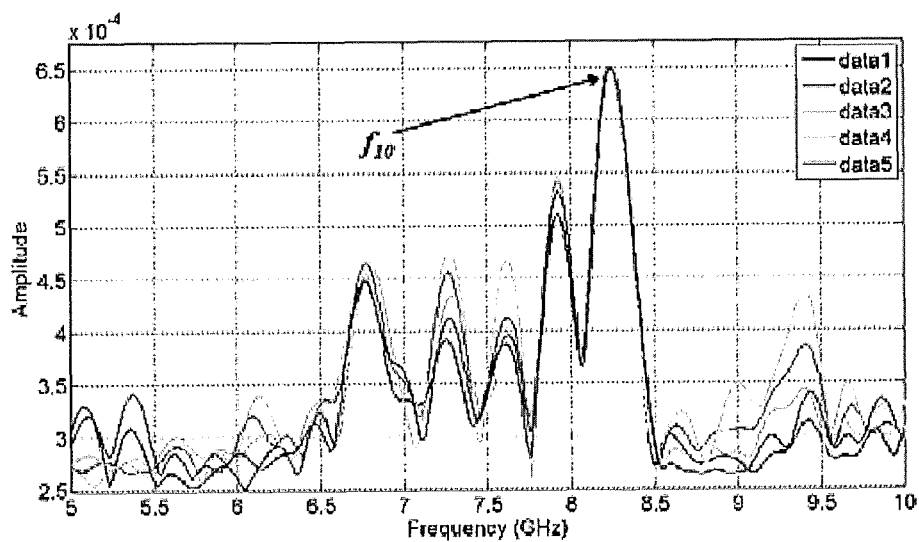
FIGS. 13 and 14 are graphs that illustrate a frequency domain antenna mode signal during signal processing, in accordance with the present invention.
Figure 14:
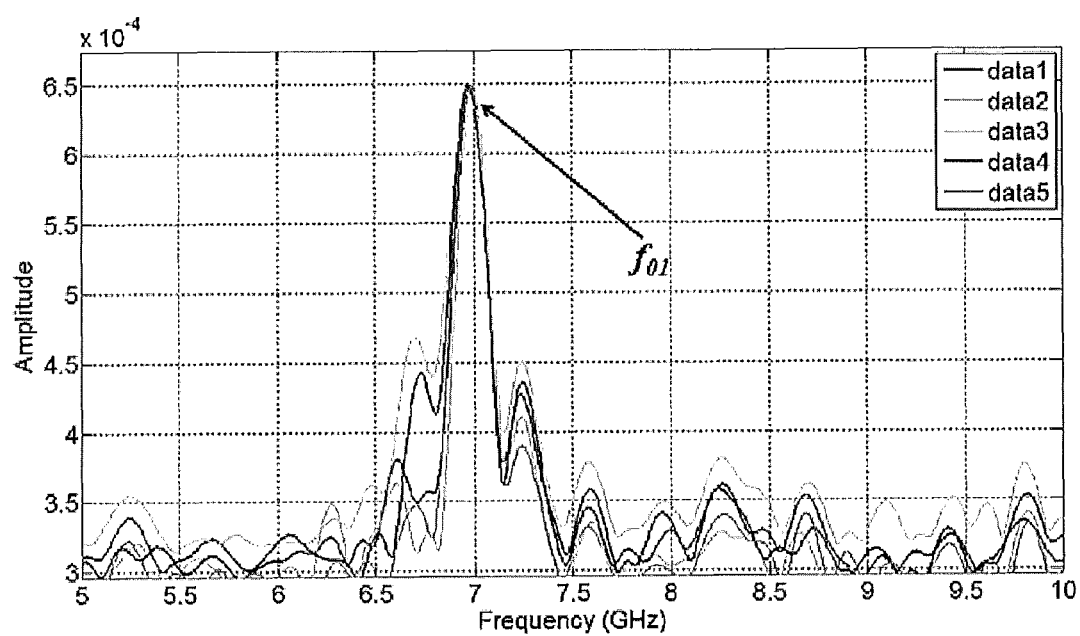

To distinguish the antenna mode from the structural model, the short-terminated signal is subtracted from the open-terminated signal to cancel out the structure mode. The normalized backscatter signal after subtraction, as shown in FIG. 12, displayed a dominant wave packet at 10 ns. Because this time coincides with the time-of-flight for the EM signal to the horn antenna, this wave packet is the antenna mode signal. Before applying Fast-Fourier Transformation to the normalized signal to obtain the spectrum of the antenna mode, the antenna mode signal was extracted from the normalized time domain signal using a rectangular window spanning from 9.81 ns to 15.17 ns. This time-gating operation improves the signal-to-noise ratio of the antenna mode spectrum by removing the irrelevant signal at other time period. The frequency spectrum of the time-gated antenna mode signal is shown in FIG. 13. The resonant frequency of the patch antenna can be identified from this frequency spectrum as the frequency at which the amplitude peak is located. This frequency matches closely with that measured using S11 parameter of the patch antenna shown in FIG. 14. The repeatability of the results over five measurements indicates that the measurement system is very stable and robust.

Example

Application to Strain Detection

Based on the transmission line model, the resonant frequency of the rectangular patch antenna 10 is calculated as $$f_r = \frac{c}{2\sqrt{\varepsilon_{re}}} \frac{1}{L_e + 2\Delta L_{oc}}. \qquad \text{Equation (1)}$$

where c is the velocity of light. $L_e$ is the electric length of the antenna. The effective dielectric constant $\varepsilon_{re}$ is related to the dielectric constant of the substrate $\varepsilon_r$, the substrate thickness h, and the antenna's electric width $w_e$, i.e.

$$\varepsilon_{re} = \frac{\varepsilon_r + 1}{2} + \frac{\varepsilon_r - 1}{2\sqrt{(1 + 10\, h/w_e)}}. \qquad \text{Equation (2)}$$

The line extension $\Delta L_{oc}$ is calculated from the effective dielectric constant $\varepsilon_{re}$, the substrate thickness h, and the patch width w, $$\Delta L_{oc} = 0.412 h \frac{(\varepsilon_{re} + 0.3)(w_e/h + 0.264)}{(\varepsilon_{re} - 0.258)(w_e/h + 0.813)}. \qquad \text{Equation (3)}$$

Assuming the antenna is subjected to a tensile strain $\varepsilon_L$ along its length direction, the patch width and the substrate thickness will change due to the Poisson's effect, i.e.

$$w_e = (1 - v_p \varepsilon_L) w_{e0}, \text{ and } h \leftrightharpoons (1 - v_s \varepsilon_L) h_0. \qquad \text{Equation (4)}$$

If the Poisson's ratios of the metallic patch and the substrate material, $v_p$ and $v_s$, are the same, the ratio w/h remains to be a constant no matter how the strain $\varepsilon_L$ changes. In other words, $\varepsilon_{re}$ in Equation (2) is independent of $\varepsilon_L$ and the line extension $\Delta L_{oc}$ is proportional to the substrate thickness h. Therefore, the antenna resonant frequency can be expressed as $$f_r = \frac{c}{2\sqrt{\varepsilon_{re}}} \frac{1}{L_e + 2\Delta L_{0C}} = \frac{C_1}{L_e + C_2 h}, \qquad \text{Equation (5)}$$

where:

$$C_1 = \frac{c}{2\sqrt{\varepsilon_{re}}}; \text{ and}$$

$$C_2 = 0.812 \frac{(\varepsilon_{re} + 0.3)(w_e/h + 0.264)}{(\varepsilon_{re} - 0.258)(w_e/h + 0.813)}.$$

At an unloaded state, the antenna frequency $f_{r0}$ is calculated from the antenna length $L_{e0}$ and the substrate thickness $h_0$, $$f_{ro} = \frac{C_1}{L_0 + C_2 h_0}. \qquad \text{Equation (6)}$$

A strain $\varepsilon_L$ shifts the antenna frequency to $$f_r(\varepsilon_L) = \frac{C_1}{L_0(1 - \varepsilon_L) + C_2 h_0 (1 - v \varepsilon_L)}. \qquad \text{Equation (7)}$$

Combining Equations (6) and (7), the relationship between the frequency shift $\Delta f$ and the applied strain $\varepsilon_L$ is established as:

$$\frac{\Delta f}{f_r} = \frac{f_r - f_{r0}}{f_r} = \frac{L_{e0} + C_2 h_0}{L_{e0} + v_s C_2 h_0} \varepsilon_L = C \varepsilon_L \qquad \text{Equation (8)}$$

The constant C is governed by the substrate dielectric constant and the original antenna length. Following the same procedure, the strains applied along the antenna's electrical width direction will shift the antenna resonant frequency higher, due to the Poisson's effect. However, the strain sensitivity along the electric width direction is much smaller than that along the electric length direction. In order to achieve an antenna that is sensitive to strains along the geometric length as well as the geometric width direction of the antenna, a dual-frequency antenna, i.e. an antenna that resonates along both directions, can be utilized.

For a dual frequency antenna, the radiation mode with its electric field along the geometric length direction of the metallic patch is denoted as the $TM_{010}$ mode while the radiation model whose electric field is parallel to the geometric width direction of the metallic patch is designated as the $TM_{001}$ mode. For a chosen substrate thickness h and a relative dielectric constant $\varepsilon_r$, the dimensions of the antenna patch can be calculated from the resonant frequency that corresponding to these two radiation modes.

As discussed before, when used as a strain sensor, a passive wireless antenna sensor 18 encodes the backscattered signal with its resonance frequency when it is illuminated using an incident RF wave. Therefore, the shift in the antenna resonant frequency can be remotely interrogated by performing spectral analysis of the backscattered signal. A Vector Network Analyzer (such as the ZVA24 provided by Rohde & Schwarz, Inc.) can be used for spectral analysis. The backscattered signal includes both the antenna mode, i.e. the signal reflected by the patch antenna, and the structural mode, i.e. the signal reflected by the structures surrounding the antenna. Only the antenna mode is modulated by the mechanical strain. In order to separate the antenna mode from the structure mode, the frequency domain signals acquired by the VNA are converted to time domain so that time gating can be applied. In addition, the antenna mode can be time delayed using a short cable to separate it from the structural mode of the patch antenna and to further increase the signal to noise ratio of the antenna mode. The backscattered signal obtained from a short-terminated delay cable is subtracted from the backscattered signal measured from an open-terminated delay cable. Because the antenna mode for these two types of impedance loading has a 180 degree phase difference, the intensity of the normalized antenna mode is doubled while the structure mode is cancelled.

It will be understood that particular embodiments described herein are shown by way of illustration and not as limitations of the invention. The principal features of this invention can be employed in various embodiments without departing from the scope of the invention. For example, without limiting the scope of the invention, it has been described in connection with patch antennas. Those skilled in the art will recognize, or be able to ascertain using no more than routine experimentation, numerous equivalents to the specific devices, systems and methods described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification, but only by the claims.

We claim:

1. A monitoring apparatus for determining a condition of a structure using a passive wireless antenna (PWA), comprising:
 a remote interrogation system that is configured to remotely interrogate a passive wireless antenna (PWA) that is mounted on the structure, the remote interrogation system comprising:
  a pulse generator that is configured to remotely activate a switching circuit associated with the PWA;
  a transceiver that is configured to:
   transmit to the PWA a series of radio frequency (RF) signals with sweeping frequencies around a known resonant frequency of the PWA;
   receive a first state response signal reflected by the PWA in a first state prior to activating the switching circuit; and
   receive a second state response signal reflected by the PWA in a second state after the switching circuit has been activated; and
  a signal analyzer that is configured to determine a measured resonant frequency of the PWA based at least in part on a normalized antenna mode component obtained using a mathematical difference between the first state response signal and the second state response signal, wherein a difference between the measured resonant frequency of the PWA and the known resonant frequency of the PWA is indicative of the condition of the structure.

2. The apparatus of claim 1, further comprising a memory component that is configured to store the first state response signal as a reference.

3. The apparatus of claim 1, wherein the signal analyzer comprises a processor and a non-transitory computer-readable medium on which are stored instructions that, when executed by the processor, cause the processor to determine the measured resonant frequency of the PWA.

4. The apparatus of claim 3, wherein the instructions, when executed by the processor, cause the processor to determine the measured resonant frequency of the PWA by using a predetermined algorithm to extract the radiation frequency of the PWA.

5. The apparatus of claim 3, wherein the instructions, when executed by the processor, further cause the processor to determine the measured resonant frequency of the PWA by converting the first state response signal and the second state response signal from a frequency domain to a time domain, subtracting the converted first state response signal from the converted second state response signal to produce the normalized antenna mode component, time-gating the resultant normalized antenna mode component, and determining the measured resonant frequency based on the amplitude of a frequency spectrum of the normalized antenna mode component.

6. The apparatus of claim 1, wherein the pulse generator produces a stimulus that activates a circuit breaking element of the switching circuit.

7. The apparatus of claim 6, wherein the pulse generator is a LASER.

8. The apparatus of claim 6, wherein the pulse generator is a device that emits a stimulus selected from the group consisting of: electromagnetic waves, thermal radiation, magnetic forces, acoustic waves.

9. An apparatus for sensing the condition of a structure, the apparatus comprising:

a passive wireless antenna (PWA) having a known resonant frequency when mounted on the structure, wherein the PWA receives a series of radio frequency (RF) signals with sweeping frequencies around a known resonant frequency of the PWA; and a switching circuit connected to the PWA, the switching circuit being configured to be remotely and selectively activated to cause the PWA sensor to operate in a first state and a second state, wherein, responsive to the received series of RF signals, the PWA reflects a first state response signal in the first state prior to activating the switching circuit, the PWA transmits a second state response signal in the second state after the switching circuit has been activated, and a measured resonant frequency of the PWA is determined based at least in part on a normalized antenna mode component obtained using a mathematical difference between the first state response signal and the second state response signal, wherein a difference between the measured resonant frequency of the PWA and the known resonant frequency of the PWA is indicative of the condition of the structure.

10. The apparatus of claim 9, wherein the switching circuit comprises:
a circuit-breaking component that is configured to be remotely activated by receiving a non-contact stimulus.

11. The apparatus of claim 10, wherein the switching circuit further comprises:
a switch component for changing the state of the PWA between the at least two different states.

12. The apparatus of claim 11, wherein the circuit-breaking component is a pseudomorphic High Electron Mobility Transistor (pHEMT) that is configured to switch the PWA from a first state to a second state, wherein in the first state the PWA is short-circuited and in the second state the PWA is open-circuited.

13. The apparatus of claim 10, wherein the circuit-breaking component is a photocell that is configured to be remotely activated by receiving an electromagnetic pulse as the stimulus.

14. The apparatus of claim 9, wherein the measured resonant frequency of the PWA is further determined by converting the first state response signal and the second state response signal from a frequency domain to a time domain, subtracting the converted first state response signal from the converted second state response signal to produce the normalized antenna mode component, time-gating the normalized antenna mode component, and determining the measured resonant frequency based on the amplitude of a frequency spectrum of the normalized antenna mode component.

15. A method for automatically determining a measured resonant frequency of a passive wireless antenna (PWA) that is mounted on a structure, comprising:
transmitting, by a transceiver, to the PWA a series of radio frequency (RF) signals with sweeping frequencies around a known resonant frequency associated with the PWA when mounted on the structure;
receiving, by the transceiver, a reflected first state response signal;
remotely activating, by a pulse generator, a switching circuit that is mounted on the structure and connected to the PWA, whereby the switching circuit places the PWA in a second state;
receiving, by the transceiver, a reflected second state response signal; and
determining, by a signal analyzer including a processor, the measured resonant frequency of the PWA based at least in part on a normalized antenna mode component obtained using a mathematical difference between the first state response signal and the second state response signal.

16. The method of claim 15, wherein the measured resonant frequency of the PWA is determined by the processor converting the first state response signal and the second state response signal from a frequency domain to a time domain, subtracting the converted first state response signal from the converted second state response signal to produce the normalized antenna mode component, time-gating the normalized antenna mode component, and determining the measured resonant frequency based on the amplitude of a frequency spectrum of the normalized antenna mode component.

17. The method of claim 15, wherein the measured resonant frequency of the PWA is further determined by using a predetermined algorithm to extract the radiation frequency of the PWA.

* * * * *